(12) United States Patent
Beltran

(10) Patent No.: US 8,004,253 B2
(45) Date of Patent: Aug. 23, 2011

(54) DUTY CYCLE DEPENDENT NON-LINEAR SLOPE COMPENSATION FOR IMPROVED DYNAMIC RESPONSE

(75) Inventor: Israel G. Beltran, Antipolo (PH)

(73) Assignee: Astec International Limited, Hong Kong (CN)

( * ) Notice: Subject to any disclaimer, the term of this patent is extended or adjusted under 35 U.S.C. 154(b) by 470 days.

(21) Appl. No.: 12/261,154

(22) Filed: Oct. 30, 2008

(65) Prior Publication Data

US 2009/0122578 A1    May 14, 2009

Related U.S. Application Data

(60) Provisional application No. 60/986,501, filed on Nov. 8, 2007.

(51) Int. Cl.
*G05F 1/575* (2006.01)
*H02M 3/335* (2006.01)

(52) U.S. Cl. ............... 323/266; 323/285; 363/16

(58) Field of Classification Search .......... 323/266, 323/268, 271, 284, 285, 288; 363/16, 17, 363/65, 98
See application file for complete search history.

(56) References Cited

U.S. PATENT DOCUMENTS

| | | | |
|---|---|---|---|
| 6,211,657 B1 | 4/2001 | Goluszek | |
| 6,246,884 B1 | 6/2001 | Karmi et al. | |
| 7,071,660 B2 | 7/2006 | Xu et al. | |
| 7,126,318 B2 * | 10/2006 | Oswald et al. | 323/288 |
| 7,161,335 B2 * | 1/2007 | Wei et al. | 323/266 |
| 7,656,142 B2 * | 2/2010 | Liao | 323/288 |
| 7,888,919 B2 * | 2/2011 | Dishman et al. | 323/266 |
| 2007/0133232 A1 | 6/2007 | Sigamani | |

OTHER PUBLICATIONS

Control of Bifurcation in Current-Programmed DC/DC Converters: A Reexamination of Slope Compensation, ISCAS 2000—IEEE International Symposium on Circuits and Systems, May 28-31, 2000, Geneva, Switzerland.
John Betten and Robert Kollman, Easy Calculation Yields Load Transient Response, Power Electronics Technology, pp. 40, 42, 44, 46 and 48, Feb. 2005.

* cited by examiner

*Primary Examiner* — Gary L Laxton
(74) *Attorney, Agent, or Firm* — Harness, Dickey & Pierce, P.L.C.

(57) ABSTRACT

A two-stage converter including a buck converter and a DC-DC converter that receives power from the buck converter. The DC-DC converter generates an output voltage of the two-stage converter. A buck control circuit generates a drive signal for the buck converter. The drive signal is based on a first signal representing the output voltage, a second signal representing load applied to the buck converter, and a compensation signal. A characteristic of the compensation signal varies based on the drive signal.

25 Claims, 9 Drawing Sheets

DUTY CYCLE DEPENDENT NON-LINEAR SLOPE COMPENSATION FOR IMPROVED DYNAMIC RESPONSE

FIELD

The present disclosure relates to power converter feedback and control circuits.

BACKGROUND

The statements in this section merely provide background information related to the present disclosure and may not constitute prior art.

Various DC-DC converters are being used in power supplies. These converters includes buck derived topologies (such as forward converters and bridge converter), or boost derived topologies (such as a flyback converter), or multi-stage converters. One example of a multi-stage DC-DC converter is a two-stage buck-fed full-bridge converter which includes a buck converter as the first stage, and an open-loop DC-DC converter (such as full-bridge converter or an interleaved resonant converter) as the second stage.

For example, a typical buck converter employs an inductor at the output of a switching transistor placed between an energy source, such as a battery or other DC source, and the inductor of a switching transistor. A diode is typically coupled to the inductor/switching transistor interconnection. As the switching transistor is turned on and off under the control of a pulse width modulator, the inductor is energized with a current, thus storing energy in the inductor. When the switching transistor is turned off, current continues to flow through the inductor, discharging the energy stored in the inductor. Typically, a capacitor is placed across the output of the converter to hold the converter output voltage at a predetermined level during the periods when the switching transistor is charging the inductor. A buck converter operates in continuous mode if the current through the inductor remaining above zero during the commutation or discharge cycle. A buck converter operates in discontinuous mode if current though the inductor reaches zero for a period of time. DC-DC converters, especially when designed to work in a continuous mode of operation, tend to shift in operation between continuous mode and discontinuous mode during the transition from full load to light load condition.

If power consumption on a power supply varies widely over a short period of time, this greatly complicates power distribution which in turn increases the total cost of the system. Variation of power consumption, called step load, is the difference between maximum and minimum power consumption of the system.

Step loads applied to a power supply are desirably minimized because the change in current of the step load can be orders of magnitude faster than the typical reaction time of the power supply which results in a drop in output voltage. When designing a DC-DC converter, one of the many considerations is to meet the step load requirement when the converter is operating in both continuous and discontinuous mode, because the closed-loop bandwidth decreases greatly when the converter transitions from continuous mode to discontinuous mode.

One factor which limits the speed with which the converter responds to load variations is the size of the output filter inductor. The rate of change of current through the inductor is inversely related to the inductance. Thus, one way to improve the converter response time is to decrease the size of the output inductor. However, as the inductance is decreased, the inductor will operate in discontinuous mode at even higher loads. In order to maintain a continuous mode operation, the frequency at which the power switch operates generally increases, thereby increasing switching losses.

Another way to reduce the drop in output voltage is to increase the size of the output capacitor. The larger the output capacitor, the more charge stored and available for accommodating varying load requirements. However, cost and size considerations limit the feasibility of increasing the size of the output capacitor.

A converter can be controlled either in voltage mode or current mode. In a voltage mode controlled converter, the voltage appearing at the load is sensed by an error amplifier through a voltage divider network. The error amplifier generates an error voltage which is related to the voltage appearing at the output of the converter. Relatively small changes in voltage appearing at the output of the converter appears as relatively large voltage swings at the output of the error amplifier. As will be described in greater detail, the output of the error amplifier is coupled to one terminal of a comparator which has another terminal coupled to a fixed frequency ramp signal. As the voltage appearing at the output of the error amplifier varies respect to the ramp signal voltage, the output of the comparator changes state in a pulse width modulated waveform. This signal is coupled to the switching transistor to effect the switching thereof and complete a regulator loop.

In a current mode converter, a peak current detection scheme is typically employed in the generation of the pulse width modulated drive signal. Specifically, a sense resistor is placed in series with the switching transistor and inductor. The series resistor senses the current flow in the inductor. The switching transistor is typically controlled by a flip/flop having an output that varies in accordance with a clock signal having a predetermined frequency. Whenever the output of the flip-flop is high, the switching transistor turns on. When the switching transistor is turned on, current flow will begin to build in the inductor. The voltage appearing across the current sensing resistor is coupled to a comparator which is compared to an error voltage similar the one generated in voltage mode operation. As the voltage appearing across the sense resistor rises above the error voltage level, the output of the comparator changes state and resets the flip/flop, thereby turning off the switching transistor until the next clock cycle. Thus, in a current mode converter, the inductor charging cycle is initiated by a fixed frequency clock signal and is terminated once the peak inductor current reaches the error voltage level. The rate at which the current flow changes during an inductor charging cycle is referred to as the slope of the current waveform. It has been found that converters typically operate in reliable and stable manner when a ramp waveform signal is summed with the sensed current waveform.

Two-stage converters have become attractive for high input voltage and low output voltage/high output current applications. The converters typically include a buck converter in the first stage. The second stage converter is typically one of a push-pull, half-bridge, forward, and full-bridge converter design. Two-stage converters have several desirable characteristics. For example, synchronous rectification in the second stage can be optimized to use lower voltage rated MOSFETs since the transformer secondary voltage is minimized. Another characteristic is that the transformer primary voltage in the second stage is reduced and regulated by the first stage buck converter. This allows the efficiency of the second stage to be increased over single-stage design by using lower Rds (on) MOSFETs for the primary side switches.

Two-stage converters also have some disadvantages. For example, two-stage converters generally use only one control loop to regulate the output voltage. Since both the first stage and the second stage include LC filters, the control transfer function becomes $4^{th}$ order and control system design challenges increase. Conventional compensations can be used to stabilize the two-stage converter, but the dynamic response typically declines. When the two-stage converter operates with a high voltage input, such as 400V, the use of synchronous rectification in the first stage becomes less practical. Without synchronous rectification the buck converter behavior changes at light load. This further complicates the control system design. Adjusting the converter response is especially difficult for multi-stage converters, partially because of the L-C filter in the second stage converter.

Synchronous rectifiers can be employed at the buck stage to force the converter to operate in continuous mode for the complete load range. Referring now to FIG. 1, a first type of prior art two-stage converter 100 is shown. A first stage 102 includes a buck converter that feeds a DC-DC converter second stage 104. First stage 102 includes a DC supply 106. In some embodiments, DC supply 106 provides between 300V and 400V. A positive terminal of DC supply 106 connects to a drain of a FET Q1 and one end of a capacitor C1. A negative terminal of DC supply 106 connects to a ground 108 and one end of a load sensing resistor $R_S$. A first inductor L1 connects between a source of FET Q1 and the other end of capacitor C1. A drain of a FET Q2 connects to a source of FET Q1. A source of FET Q2 connects to the other end of load sensing resistor $R_S$.

A buck control circuit 110 provides a first gate drive signal 112 to a gate of FET Q1 and a second gate drive signal 114 to a gate of FET Q2. Buck control circuit 110 generates first and second gate drive signals 112, 114 based on a load feedback signal 116 that is generated across load sensing resistor $R_S$. An output voltage of first stage 102 is generated across capacitor C1.

Second stage 104 is a full bridge DC-DC converter. A source of a FET Q3 connects to a drain of a FET Q5 and to a first terminal 120 of a transformer T1. A source of FET Q4 connects to a drain of FET Q6 and a second terminal 122 of transformer T1. Second stage 104 receives power from the output of first stage 102. The input voltage positive node, which appears at the top of capacitor C1, connects to drains of FET Q3 and FET Q4. The input voltage negative node, which appears at the bottom of capacitor C1, connects to sources of FET Q5 and FET Q6. A full bridge open loop controller 122 generates gate signals that are applied to respective gates of FETs Q3-Q6.

Transformer T1 includes a center-tapped secondary winding. The secondary winding includes a first terminal 130, a second terminal 132 and a center tap 134. A rectifier D1 has an anode connected to first terminal 130 and a cathode connected to a first end of a second inductor L2. A rectifier D2 has an anode connected to second terminal 132 and a cathode connected to the cathode of rectifier D1 and the first end of second inductor L2. The other end of inductor L2 connects to one end of a capacitor C2. The other end of capacitor C2 connects to center tap 134. The output voltage of two-stage converter 100 is generated across capacitor C2.

Buck control circuit 110 receives a feedback signal 140 that is based on the output voltage across capacitor C2. The feedback signal arrives at buck control circuit 110 through a feedback path that includes a compensation circuit 150 and an opto-isolator 152. The output voltage across capacitor C2 is applied to a first end of a capacitor C3 and one end of a resistor R1. The other end of capacitor C3 connects to a first end of a resistor R2. The second ends of resistors R1 and R2 are connected together and also connected to one end of a resistor R3 and an inverting input 154 of an operational amplifier 156. The other end of resistor R3 connects to ground 108. A non-inverting input of operational amplifier 156 receives a reference voltage from a secondary DC supply 159. The secondary DC supply 159 is referenced to ground 108. An output 160 of operational amplifier 156 connects to inverting input 154 through a capacitor C4 connected in parallel with a series combination of a resistor R4 and a capacitor C5. Output 160 also connects to a first end of a resistor R5. The other end of resistor R5 connects to an anode of opto-isolator 152. A cathode of opto-isolator 152 connects to ground 108. The feedback signal 140 is generated by an open-collector output of opto-isolator 152. An emitter of the open collector transistor connects to ground 108.

Referring now to FIG. 2 a second type of prior art two-stage converter 200 is shown. Two-stage converter 200 is identical to two-stage converter 100 with the exception of having a first stage 202 that includes a buck-converter of an alternate construction. First stage 202 receives power from DC supply 106. The positive terminal of DC supply 106 connects to a cathode of a rectifier D4 and to one end of a capacitor C10. The other end of capacitor C10 connects to one end of an inductor L3. The other end of inductor L3 connects to an anode of rectifier D4 and a drain of a FET Q10. A source of FET Q10 connects to one end of load sensing resistor $R_S$. A second end of load sensing resistor $R_S$ connects to ground 108 and the negative terminal of DC supply 106. An output voltage of first stage 202 is generated across capacitor C10 and applied to the full bridge rectifier of second stage 104.

A buck control circuit 204 receives a sensed inductor current signal 206 that is generated across load sensing resistor $R_S$. Buck control circuit 204 uses a peak current mode control scheme that is implemented with a first integrated circuit U1. In some embodiments, U1 includes a UC3842 device available from Fairchild Semiconductor. Buck control circuit 204 generates a gate drive signal 208 that is applied to a gate of FET Q10 through a resistor R12. The other end of resistor R12 connects to pin 6 of integrated circuit U1. A secondary supply voltage 210 is referenced to ground 108 and connects to pin 7 of integrated circuit U1. The feedback signal 104 from opto-isolator 152 connects to one end of a resistor R14 and to pin 1 of integrated circuit U1. The other end of resistor R14 connects to pin 8 of integrated circuit U1 and to one end of a resistor R16. The other end of resistor R16 connects to one end of a resistor R17, one end of a capacitor C11, and pin 4 of integrated circuit U1. The other end of capacitor C11 connects to ground 108. A capacitor C12 connects between pin 3 of integrated circuit U1 and ground 108. pins 2 and 5 of integrated circuit U1 connect to ground 108. The sensed inductor current signal 206 connects to one end of a resistor R18. The other end of resistor R18 connects to the other end of resistor R17, the other end of capacitor C12, and pin 3 of integrated circuit U1. Integrated circuit U1 generates a ramp waveform at pin 4. The ramp waveform is added to the sensed inductor current signal 206 through resistor R17 and generates the gate drive signal from FET Q10 at pin 6 of integrated circuit U1.

The statements in this section merely provide background information related to the present disclosure and may not constitute prior art.

SUMMARY

A two-stage converter is disclosed that includes a buck converter, a DC-DC converter that receives power from the buck converter and generates an output voltage of the two-stage converter, a buck control circuit that generates a drive signal for the buck converter, a compensation circuit that generates a compensation signal having a non-linear characteristic based on the drive signal. The drive signal is based on a first signal representing the output voltage, a second signal representing load applied to said buck converter, and the compensation signal.

A method for operating a two-stage converter comprising is provided. The method includes reducing a first voltage to a second voltage, reducing the second voltage to a load voltage, and controlling the second voltage via a drive signal based on a first signal representing the load voltage, a second signal representing load applied to the second voltage, and a compensation signal. The compensation signal having a non-linear characteristic based on the drive signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
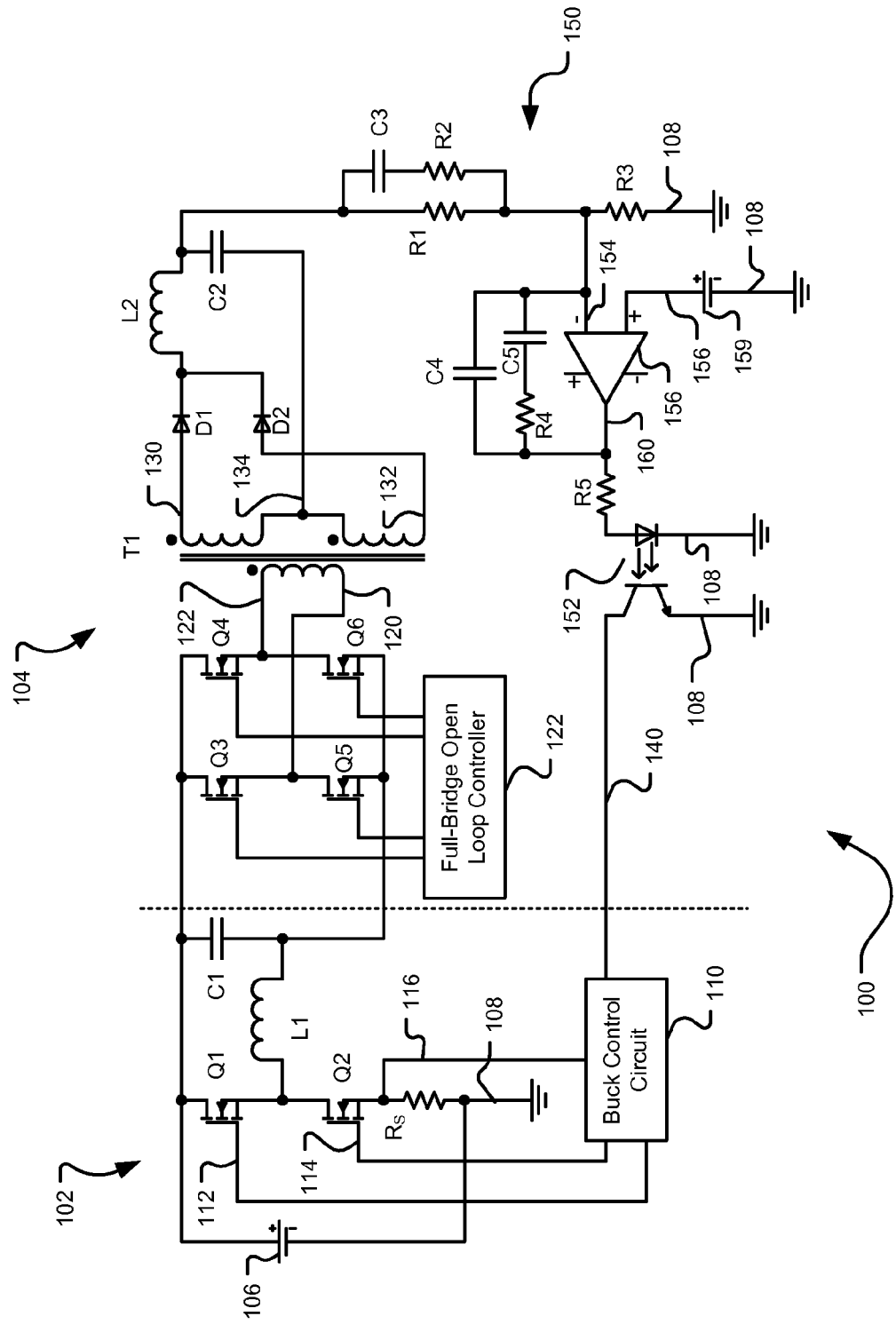
FIG. 1 is a schematic diagram of a first two-stage converter of the prior art.

The following description is merely exemplary in nature and is not intended to limit the present disclosure, application, or uses. It should be understood that throughout the drawings, corresponding reference numerals indicate like or corresponding parts and features.

Figure 3:
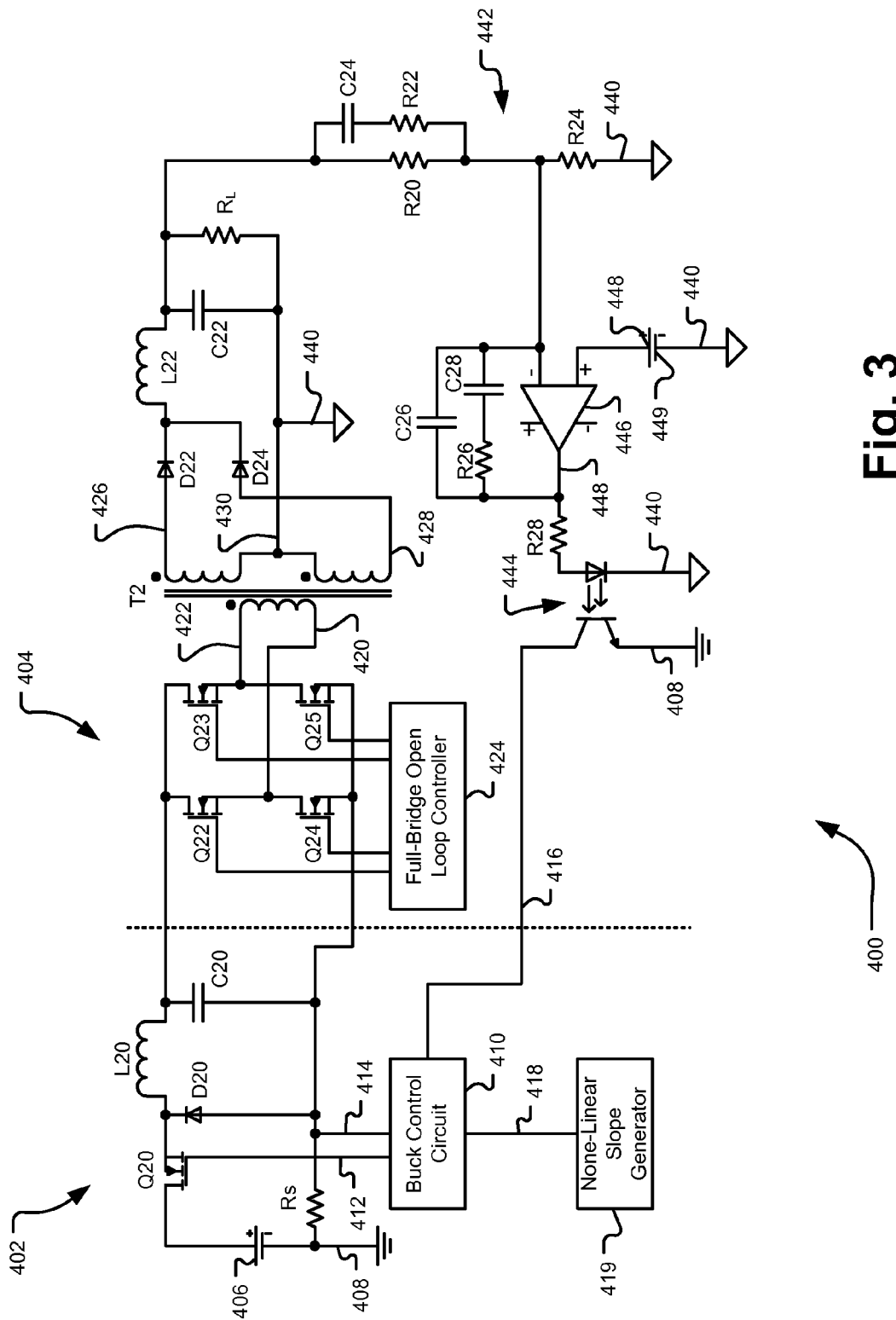
FIG. 3 is a schematic diagram of an improved two-stage converter.

Referring now to FIG. 3, one of several embodiments of an improved two-stage converter 400 is shown. A first stage 402 includes a buck converter and a second stage 404 includes a full bridge DC-DC converter. First stage 402 receives power from a DC supply 406. A positive terminal of DC supply 406 connects to a drain of a FET Q20. A source of FET Q20 connects to a cathode of a rectifier D20 and one end of an inductor L20. The other end of inductor L20 connects to one end of a capacitor C20. The other end of capacitor C20 connects to an anode of rectifier D20. A negative terminal of DC supply 406 connects to ground 408 and to one end of a load sensing resistor $R_S$. The output voltage of first stage 402 is generated across capacitor C20.

A buck control circuit 410 generates a buck converter drive signal 412 that is applied to first stage 402. In some embodiments, buck converter drive signal 412 communicates with a gate of FET Q20. Buck control circuit 410 receives a load signal 414 that is generated across load sensing resistor $R_S$, a feedback signal 416 that is based on an output voltage signal of the two-stage converter 400, and a ramp signal 418. A characteristic, such as rise time of ramp signal 418, is based on the duty cycle that is applied by the buck control circuit 410 to the two-stage converter 400. Ramp signal 418 is generated by a non-linear slope generator 419. One of several embodiments of non-linear slope generator 419 is described below.

Second stage 404 receives power from first stage 402. The positive voltage at the first end of capacitor C20 is applied to drains of FETs Q22 and Q23. A source of FET Q22 connects to a drain of a FET Q24 and to a primary terminal 420 of a transformer T2. A source of FET Q23 connects to a drain of a FET Q25 and to a second terminal 422 of the primary winding of transformer T2. Sources of FETs Q24 and Q25 connect to the other end of capacitor C20. A full bridge open loop controller 424 generates gate signals that are applied to respective gates of FETs Q22, Q23, Q24, and Q25.

Transformer T2 includes a center-tapped secondary winding that has a first terminal 426, a second terminal 428, and a center tap 430. First terminal 426 connects to an anode of a rectifier D22. Second terminal 428 connects to an anode of a rectifier D24. Cathodes of rectifiers D22 and D24 are connected together and to one end of an inductor L22. The other end of inductor L22 connects to one end of a capacitor C22. The other end of capacitor C22 connects to center tap 430 and a reference node 440. An output voltage of second stage 404 is generated across capacitor C22 and applied to a feedback compensation circuit 442.

Feedback compensation circuit 442 generates the feedback signal 416 based on the output voltage appearing across capacitor C22. Feedback compensation circuit 442 includes a first resistor R20 that is connected in parallel with a series combination of a resistor R22 and a capacitor C24. One end of resistor R20 receives the output voltage from capacitor C22. The other ends of resistors R20 and R22 connect to an inverting input of an operational amplifier 446 and to one end of a resistor R24. The other end of resistor R24 connects to reference node 440. A secondary power supply 449 is referenced to the reference node 440 and applies a positive voltage to a non-inverting input of operational amplifier 446. A feedback circuit connects between an output 448 and the inverting input of operational amplifier 446. The feedback circuit includes a capacitor C26 connected in parallel with a series combination of a resistor R26 and a capacitor C28. The output 448 connects to an input of an opto-isolator 444 through a resistor R28. An output of opto-isolator 444 generates the feedback signal 416.

Figure 4:
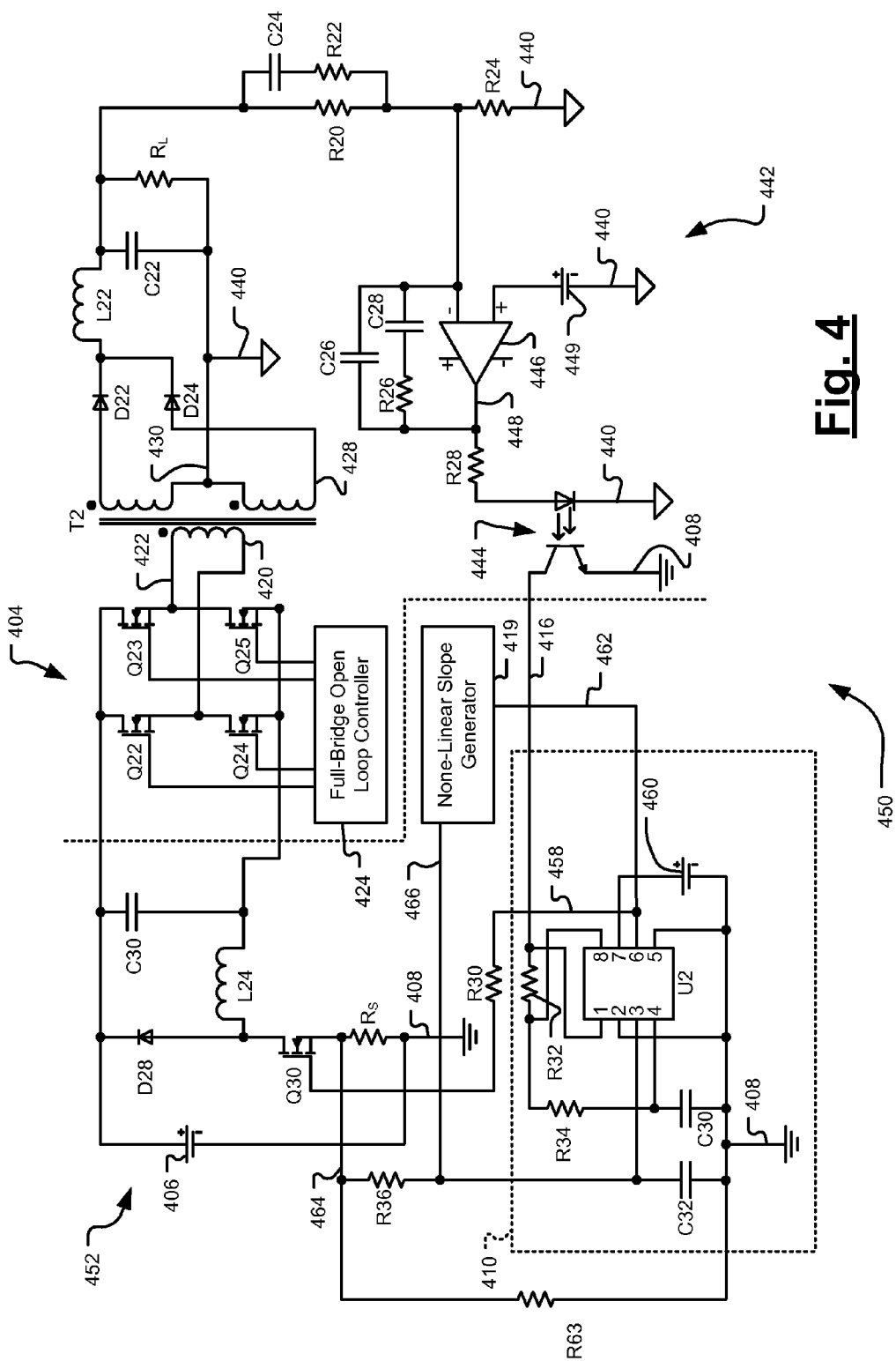
FIG. 4 is a schematic diagram of a second improved two-stage converter.

Referring now to FIG. 4 a second type of improved two-stage converter 450 is shown. Two-stage converter 450 is identical to two-stage converter 400 with the exception of having a first stage 452 of an alternate construction. First stage 452 includes a buck converter that receives power from DC supply 406. The positive terminal of DC supply 406 connects to a cathode of a rectifier D28 and to one end of a capacitor C30. The other end of capacitor C30 connects to one end of an inductor L24. The other end of inductor L24 connects to an anode of rectifier D28 and a drain of a FET Q30. A source of FET Q30 connects to one end of load sensing resistor $R_S$. A second end of load sensing resistor $R_S$ connects to ground 408 and the negative terminal of DC supply 406. An output voltage of first stage 452 is generated across capacitor C30 and applied to the full bridge rectifier of second stage 404.

Some embodiments of buck control circuit 410 receive a sensed inductor current signal 206 that is generated across load sensing resistor $R_S$. Buck control circuit 410 uses a peak current mode control scheme that is implemented with an integrated circuit U2. In some embodiments, U2 includes a UC3842 device available from Fairchild Semiconductor. Buck control circuit 410 generates a gate drive signal 458 that is applied to a gate of FET Q30 through a resistor R30. In various embodiments, the gate drive signal is also applied to a first node 462. The other end of resistor R30 connects to pin 6 of integrated circuit U2. A secondary supply voltage 460 is referenced to ground 408 and connects to pin 7 of integrated circuit U2. The feedback signal 416 from opto-isolator 444 connects to one end of a resistor R32 and to pin 1 of integrated circuit U2. The other end of resistor R32 connects to pin 8 of integrated circuit U2 and to one end of a resistor R34. The other end of resistor R34 connects to one end of a capacitor C30 and pin 4 of integrated circuit U2. The other end of capacitor C30 connects to ground 408. A capacitor C32 connects between pin 3 of integrated circuit U2 and ground 408. Pins 2 and 5 of integrated circuit U2 connect to ground 408. The sensed inductor current signal 206 connects to one end of a resistor R36 and to ground 408 through another resistor $R_{SENSE}$. The other end of resistor R36 connects to the other end of capacitor C32, pin 3 of integrated circuit U2, and a second node 466 of non-linear slope generator 419.

Operation of buck control circuit 410 and non-linear slope generator 419 will now be described. Non-linear slope generator 419 generates a compensation ramp signal at node 466. Non-linear slope generator varies a rising slope of the compensation ramp signal according to the gate drive signal. An amplitude of the compensation ramp signal increases/decreases as the duty cycle of gate drive signal 458 increases/decreases.

The output voltage of the first stages 402 (FIG. 3) and 452 (FIG. 4) varies with the output current through $R_L$. The output voltage variations are due to voltage drops across the components in first stages 402 and 452 and due to compensating the duty cycle of the gate control 412 (FIG. 3) and 458 (FIG. 4) due to leakage inductance in transformer T2. The duty cycle variation is small when output current through $R_L$ is high enough to make it operate in continuous mode. Duty cycle variation becomes large when output current through $R_L$ becomes low enough to make it operate in discontinuous mode.

Figure 5:
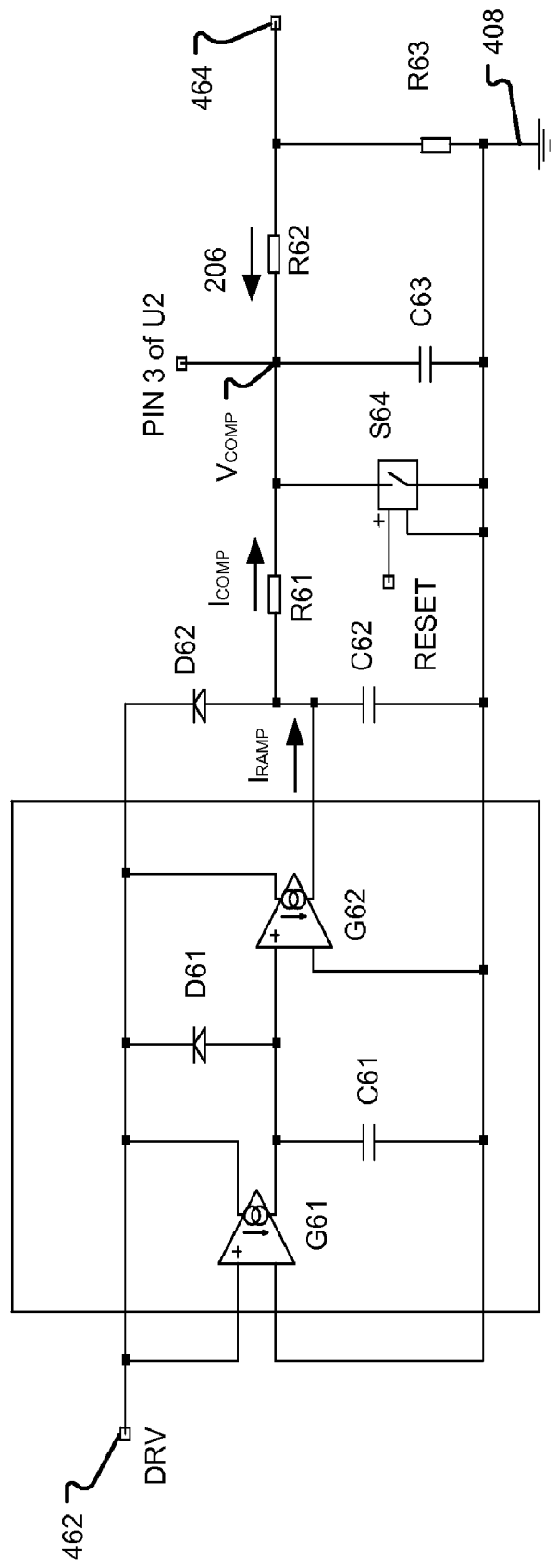
FIG. 5 is a schematic diagram of a non-linear slope generator.

Referring now to FIG. 5, the operation of one of several embodiments of dynamic slope generator 419 will now be described. A voltage dependent current source G61 is provided with the gate drive signal DRV from node 462, which is the output of pin 6 of integrated circuit U2. An output of voltage dependent current source G61 connects with a first end of a capacitor C61. The other end of capacitor C61 connects to ground 408. When the gate drive signal DRV is high, voltage dependent current source G61 charges a capacitor C61. A diode D61 is connected between the output of voltage dependent current source G61 and node 462, with its cathode connected to node 462. When the gate drive signal DRV input is low, capacitor C61 is discharged through diode D61.

The first end of capacitor C61 connects to an input of voltage dependent current source G62. A voltage $V_{C61}$ of C61 and the gate drive signal DRV are provided to voltage dependent current source G62. The voltage dependent current source G62 generates a current $I_{RAMP}$, which charges a capacitor C62, in accordance with a voltage $V_{C61}$ carried by capacitor C61. The waveform shape of voltage $V_{C61}$ is a generally linear ramp. Thus, the waveform shape of current $I_{RAMP}$ is also a generally linear ramp. The output of voltage dependent current source G62 connects to a first end of capacitor C62. The other end of capacitor C62 connects to ground 408. When the gate drive signal DRV is high, voltage dependent current source G62 provides current $I_{RAMP}$ to capacitor C62. Because the magnitude of the current $I_{RAMP}$ provided to capacitor C62 increases in accordance with voltage $V_{C61}$, a voltage $V_{C62}$ carried by capacitor C62 increases non-linearly. A diode D62 is connected between the first end of capacitor C62 and the node 462, with its cathode connected to node 462. When the gate drive signal DRV input is low, the capacitor C62 is discharged through the diode D62.

A first end of a resistor R61 connects to the first end of capacitor C62. The other end of resistor R61 can connect to one ends of a resistor R62, a capacitor C63, a switch S64 and pin 3 of integrated circuit U2. Resistor R62 and capacitor C63 can be used for leading edge filtering of sensed inductor current signal 206. The other end of capacitor C63 connects to ground 408. The other end of resistor R62 receives sensed inductor current signal 206 from node 464. A resistor R63 is connected between node 466 and ground 408. Resistor R61 can be adjusted to vary a compensation ramp voltage $V_{COMP}$ input to pin 3 of integrated circuit U2. A compensation ramp signal $I_{COMP}$ flows through resistor R61 and is combined with sensed inductor current signal 206. An optional switch S64 is used to discharge C63 that resets pin 3 of integrated circuit U2 when the gate drive signal DRV is low.

Figure 6:
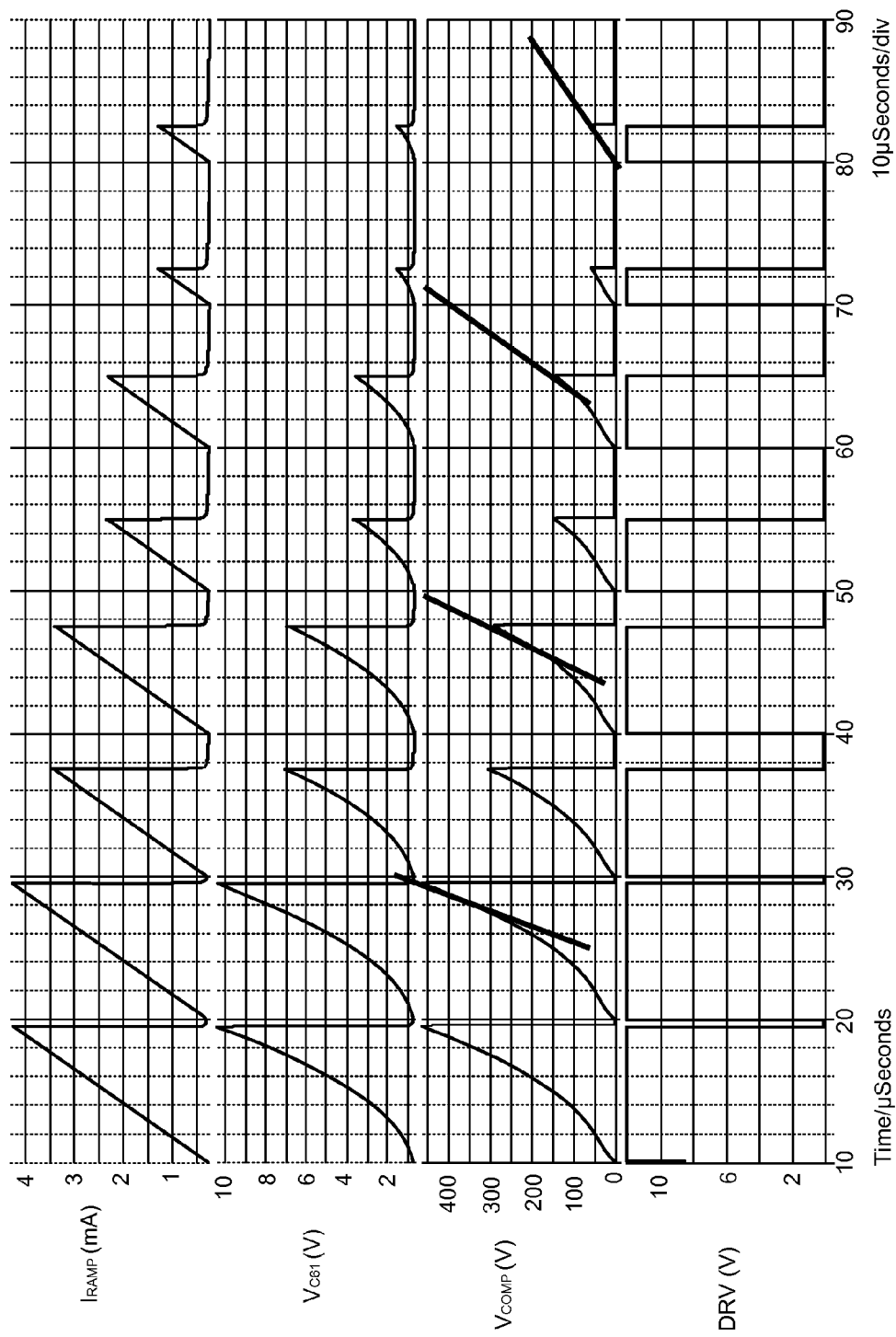
FIG. 6 are waveforms of the non-linear slope generator.

Referring now to FIG. 6, the output waveforms of charging current $I_{RAMP}$, voltage $V_{C61}$, voltage $V_{COMP}$, and the gate drive signal DRV are shown. The gate drive signal DRV is in a pulse width modulated waveform. Current $I_{RAMP}$ is in a generally linear ramp shape. Voltage $V_{C61}$ is in a generally linear ramp shape. Voltage $V_{COMP}$ increases/decreases non-linearly in accordance with the increase/decrease of the duty cycle of the gate drive signal DRV. The dynamic slope generator generates higher ramp for higher duty cycles, which increases the stability of the DC-DC converter.

Figure 7:
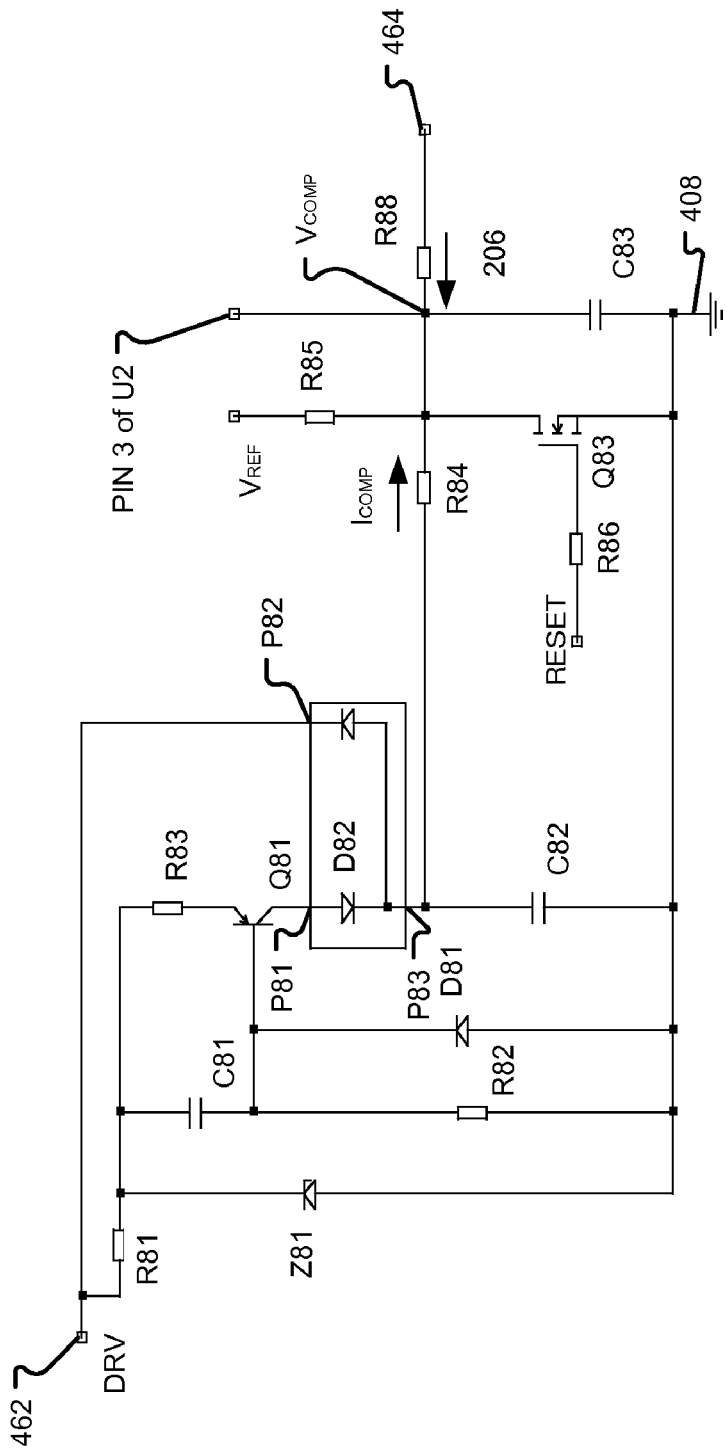
FIG. 7 is a schematic diagram of a second non-linear slope generator.

Referring to FIG. 7, one of several embodiments of the non-linear slope generator 419 is now described. The non-linear slope signal is generated across a capacitor C83 and provided to pin 3 of integrated circuit U2. The gate drive signal DRV is provided to a first end of a zener diode Z81, and a first end of a capacitor C81 through a resistor R81. Zener diode Z81 and resistor R81 are used to limit voltage being applied by the drive signal DRV. The breakdown voltage of zener diode Z81 is lower than a high value of the gate drive signal DRV. The other end of capacitor C81 connects to a first end of a resistor R82. The other end of resistor R82 connects to ground 408. When the gate drive signal DRV is high, the voltage generated across the zener diode Z81 charges the capacitor C81 through the resistor R82. The first end of a zener diode Z81 connects to the emitter of a PNP transistor Q81 through a resistor R83. The first end of resistor R82 connects to the base of PNP transistor Q81. Resistor R82 and capacitor C81 generate a generally linear ramp voltage, when a voltage $V_{C81}$ carried by capacitor C81 increases from zero to approximately a third of the breakdown voltage of zener diode Z81. Capacitor C81 also connects to ground 408 through a diode D81 having an cathode connected to capacitor C81. When the gate drive signal DRV is low, the voltage $V_{C81}$ carried by capacitor C81 is discharged through diode D81 and resistor R81.

The first end of capacitor C81 connects to the emitter of PNP transistor Q81 through resistor R83. The other end of capacitor C81 connects to the base of PNP transistor Q81. The collector of PNP transistor Q81 connects to an anode of one part of a dual diode D82 via a node P81. A node P83 connects to a first end of a capacitor C82. The other end of capacitor C82 connects to ground 408. A node P82 that is a cathode of the other part of a dual diode D82 connects to node 462. When the gate drive signal DRV is high, a current from the collector of PNP transistor Q81 flows through node P81 and node P83 to capacitor C82. When the gate drive signal DRV is low, capacitor C82 is discharged though node P83 and node P82 to node 462. Capacitor C81, PNP transistor Q81, and resistor R83 are configured to generate the generally linear ramp current $I_{RAMP}$, which charges capacitor C82.

A voltage $V_{C82}$ carried by capacitor C82 is provided to pin 3 of integrated circuit U2 through a resistor R84. The sensed inductor current signal 206 is provided to pin 3 of integrated circuit U2 through a RC circuit including a resistor R88 and a capacitor C83. Resistor R88 and capacitor C83 provide leading edge filtering of the sensed inductor current signal 206. Compensation ramp voltage $V_{COMP}$ input to pin 3 of integrated circuit U2 is proportional to a sum of current $I_{COMP}$ passing resistor R84 and the sensed inductor current signal 206 passing resistor R88.

A switch Q83 connects two ends of capacitor C83 for discharging capacitor C83. A RESET input, which is derived by inverting the drive signal DRV, is provided to turn on and off switch Q83 through a resistor R86. When switch Q83 is turned off, the discharge current of the drain to gate internal capacitance of Q83 flowing through resistor R86 makes the input of pin 3 of integrated circuit U2 slightly negative, which generates a minimum duty cycle during light load condition. A voltage $V_{REF}$ is applied across capacitor C83 through a resistor R85 to immediately charge capacitor C83 when the voltage of capacitor C83 is negative. Resistor R85 can be adjusted to provide a defined ramp upto approximately 0% duty cycle.

Figure 8:
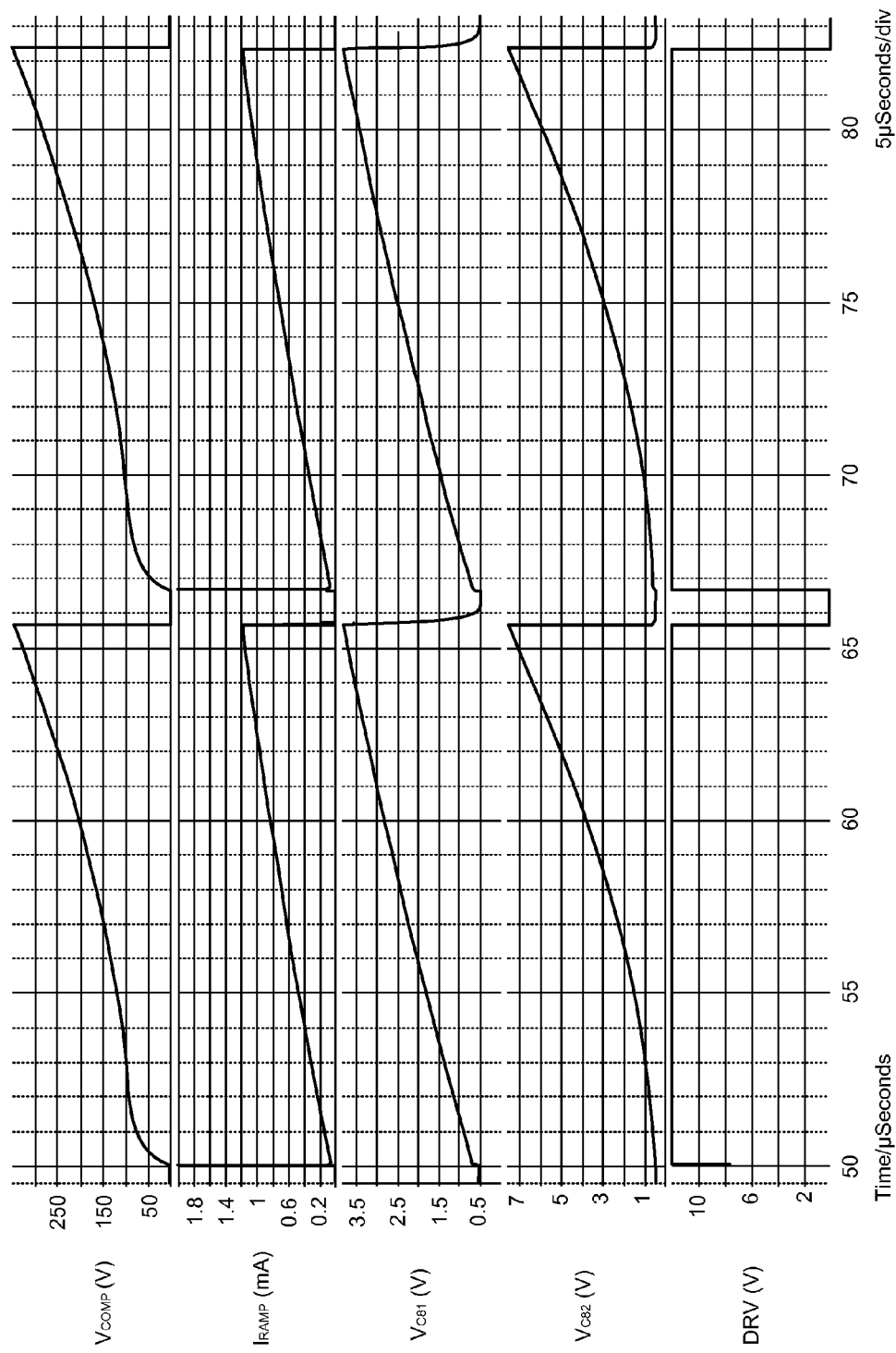
FIG. 8 are waveforms of the second non-linear slope generator.

Referring now to FIG. 8, the output waveforms of voltage $V_{COMP}$, current $I_{RAMP}$, voltage $V_{C81}$, Voltage $V_{C82}$, and the gate drive signal DRV are shown. The gate drive signal DRV is in a pulse width modulated waveform. The waveform of current $I_{RAMP}$ is in a generally linear ramp shape. The value of the current $I_{RAMP}$ increases/decreases in accordance with the increase/decrease of the duty cycle of the gate drive signal DRV. Voltage $V_{C81}$ is in a generally linear ramp shape. Voltage $V_{C82}$ increases/decreases non-linearly in accordance with the increase/decrease of the duty cycle of the gate drive signal DRV. Voltage $V_{COMP}$, which is based on the sensed inductor current signal 206 and current $I_{COMP}$, is in a non-linear ramp shape.

Figure 2:
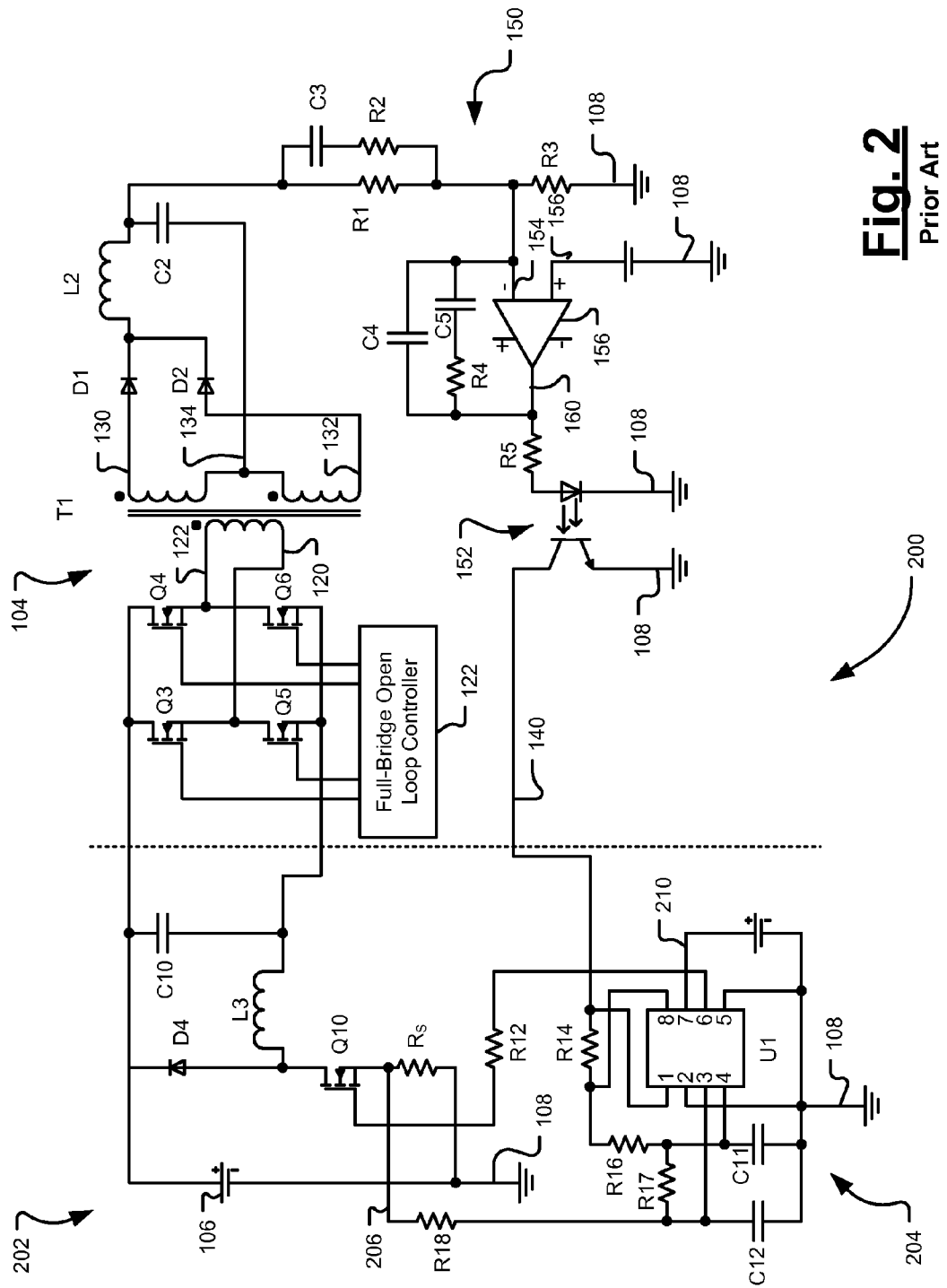
FIG. 2 is a schematic diagram of a second two-stage converter of the prior art.
Figure 9:
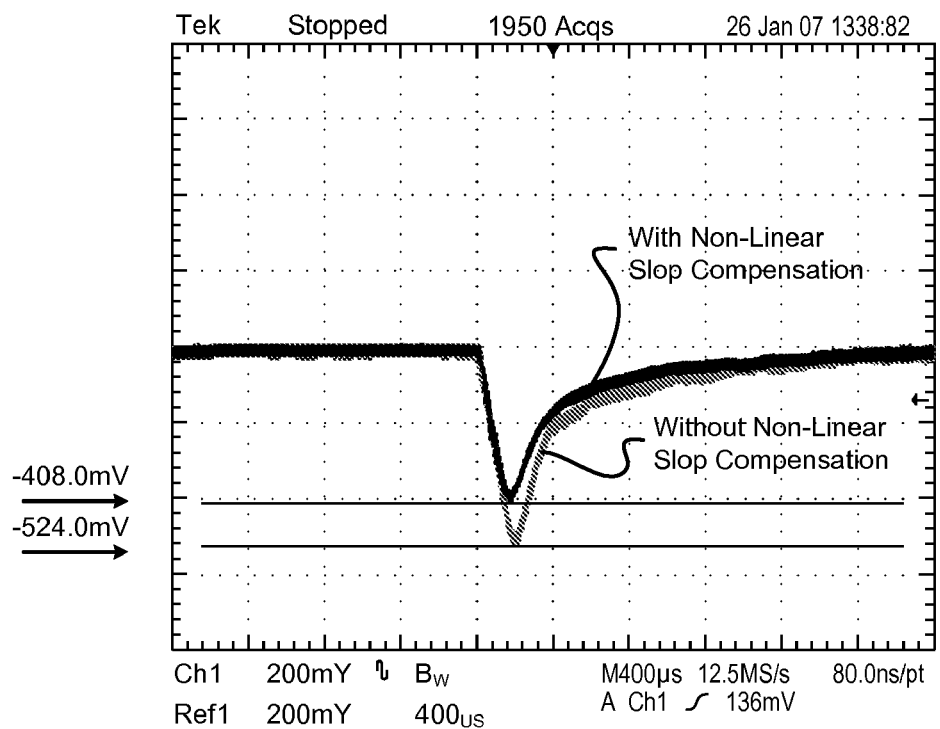
FIG. 9 are output voltage waveforms comparison of the second improved two stage-converter employing the second non-linear slope generator and the second two-stage converter of the prior art.
Figure 9:
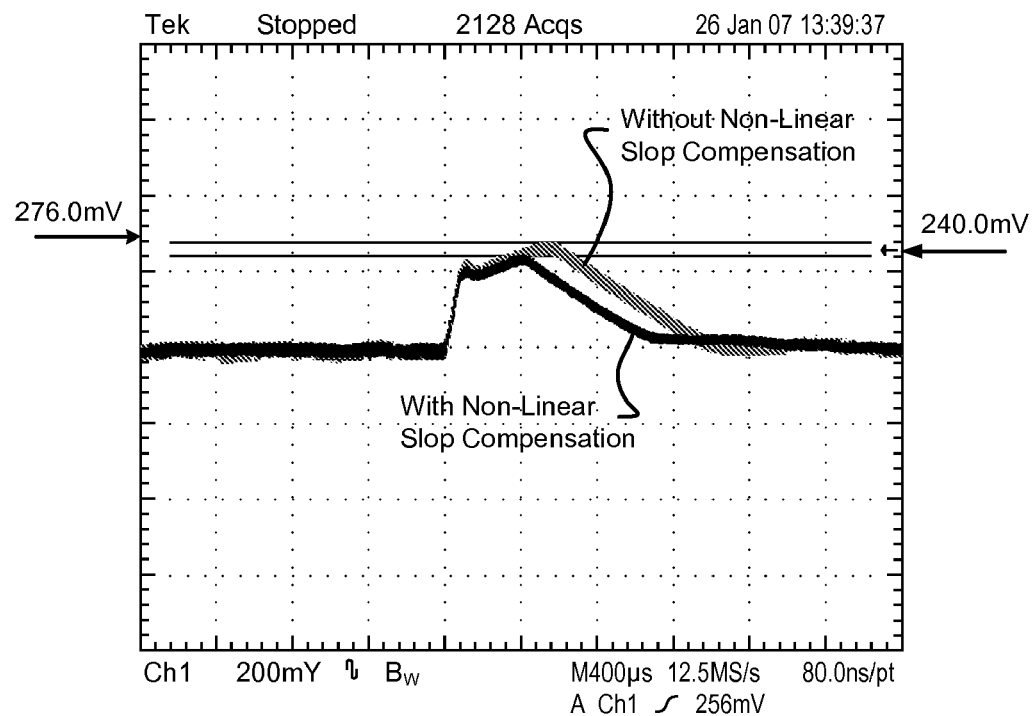

Referring now to FIG. 9, the output voltage waveforms during step load condition of the second improved two-stage converter employing the second non-linear slope generator (as shown in FIG. 4 and FIG. 7) is compared with the second two-stage converter of the prior art (as shown in FIG. 2). The output waveforms shows reduced voltage ripples with non-linear slope compensation as a load alternates between 2A-42A at 0.5 A/μS.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A two-stage converter comprising:
a buck converter;
a DC-DC converter that receives power from the buck converter and generates an output voltage of the two-stage converter;
a buck control circuit that generates a drive signal for the buck converter;
a compensation circuit that generates a compensation signal having a non-linear characteristic based on the drive signal, and
wherein the drive signal is based on a first signal representing the output voltage, a second signal representing load applied to said buck converter, and the compensation signal.

2. A two-stage converter of claim 1, wherein the non-linear characteristic includes a slope.

3. The two-stage converter of claim 2, wherein the slope of the compensation signal at an end of a selected time period varies in accordance with a duration of the selected time period.

4. The two-stage converter of claim 3, wherein said the drive signal is pulse-width-modulated (PWM).

5. The two-stage converter of claim 4, wherein the selected time period defines a duty cycle of the drive signal.

6. The two-stage converter of claim 2, wherein said compensation circuit defines a first generally linear signal, and the slope of the compensation signal varies in accordance with the first signal.

7. The two-stage converter of claim 6, wherein said compensation circuit defines the non-linear characteristic of the compensation signal based on the first signal.

8. The two-stage converter of claim 1, wherein the compensation circuit further includes
a first capacitance; and
a second capacitance,
wherein the non-linear characteristic of the compensation signal is determined based on said first and second capacitances.

9. The two-stage converter of claim 8, wherein said first capacitance stores a first voltage, and said second capacitance receives a linear ramp current based on the first voltage.

10. The two-stage converter of claim 9, wherein the compensation circuit includes a voltage dependent current source that receives the first voltage and generates the linear ramp current.

11. A method for operating a two-stage converter comprising
reducing a first voltage to a second voltage;
reducing the second voltage to a load voltage; and
controlling the second voltage via a drive signal based on a first signal representing the load voltage, a second signal representing load applied to the second voltage, and a compensation signal, wherein the compensation signal has a non-linear characteristic based on the drive signal.

12. The method of claim 11, wherein the non-linear characteristic includes a slope.

13. The method of claim 12, wherein the slope the compensation signal at an end of a selected time period varies in accordance with a duration of the selected time period.

14. The method of claim 13, wherein said the drive signal is pulse-width-modulated (PWM).

15. The method of claim 14, wherein the selected time period defines a duty cycle of the drive signal.

16. The method of claim 12, further comprising generating the compensation signal based on a first generally linear signal, and wherein the slope of the compensation signal varies in accordance with the first signal.

17. A two-stage converter comprising:
buck converter means for reducing an input voltage to a second voltage;
DC-DC converter means for receiving power from the buck converter means and generating an output voltage of the two-stage converter; and compensation circuit means for generating a compensation signal, buck control means for controlling the second voltage via a drive signal based on a first signal representing the output voltage, a second signal representing load applied to the buck converter means, and the compensation signal, wherein the compensation signal has a non-linear characteristic based on the drive signal.

18. The two-stage converter of claim 17, wherein the non-linear characteristic includes a slope.

19. The two-stage converter claim 18, wherein the slope at an end of a selected time period varies in accordance with a duration of the selected time period.

20. The two-stage converter claim 19, wherein said the drive signal is pulse-width-modulated (PWM).

21. The two-stage converter of claim 20, wherein the selected time period defines a duty cycle of the drive signal.

22. The two-stage converter of claim 18, wherein said compensation circuit means defines a first generally linear signal, and the slope of the compensation signal varying in accordance with the first signal.

23. The two-stage converter of claim 17, wherein the compensation circuit means further including
a first capacitive means; and
a second capacitive means,
wherein the non-linear characteristic of the compensation signal is determined based on said first and second capacitive means.

24. The two-stage converter of claim 23, wherein said first capacitive means stores a first voltage, and said second capacitive means receives a linear ramp current based on the first voltage.

25. The two-stage converter of claim 24, wherein the compensation circuit means includes a voltage dependent current source that receives the first voltage and generates the linear ramp current.

* * * * *